No. 716,124. Patented Dec. 16, 1902.
S. M. SPANGLER.
COMBINED SCRAPER AND SCOOP.
(Application filed July 5, 1902.)
(No Model.)

Witnesses
Inventor
Simon M. Spangler
by
Attorney

THE NORRIS PETERS CO., PHOTO-LITHO., WASHINGTON, D. C.

UNITED STATES PATENT OFFICE.

SIMON M. SPANGLER, OF NEWTON, KANSAS.

COMBINED SCRAPER AND SCOOP.

SPECIFICATION forming part of Letters Patent No. 716,124, dated December 16, 1902.

Application filed July 5, 1902. Serial No. 114,445. (No model.)

*To all whom it may concern:*

Be it known that I, SIMON M. SPANGLER, a citizen of the United States, residing at Newton, in the county of Harvey and State of Kansas, have invented certain new and useful Improvements in a Combined Scraper and Scoop, of which the following is a specification.

My invention relates to improvements in a combined scraper and scoop; and the object of my invention is the provision of a simple, inexpensive, and thoroughly practical scraper and scoop particularly adapted for scraping and conveying manure, dirt, grass, or other material in an efficient manner.

With this object in view my invention consists of a combined scraper and scoop embodying novel features of construction and combination of parts, substantially as disclosed herein.

Figure 1:
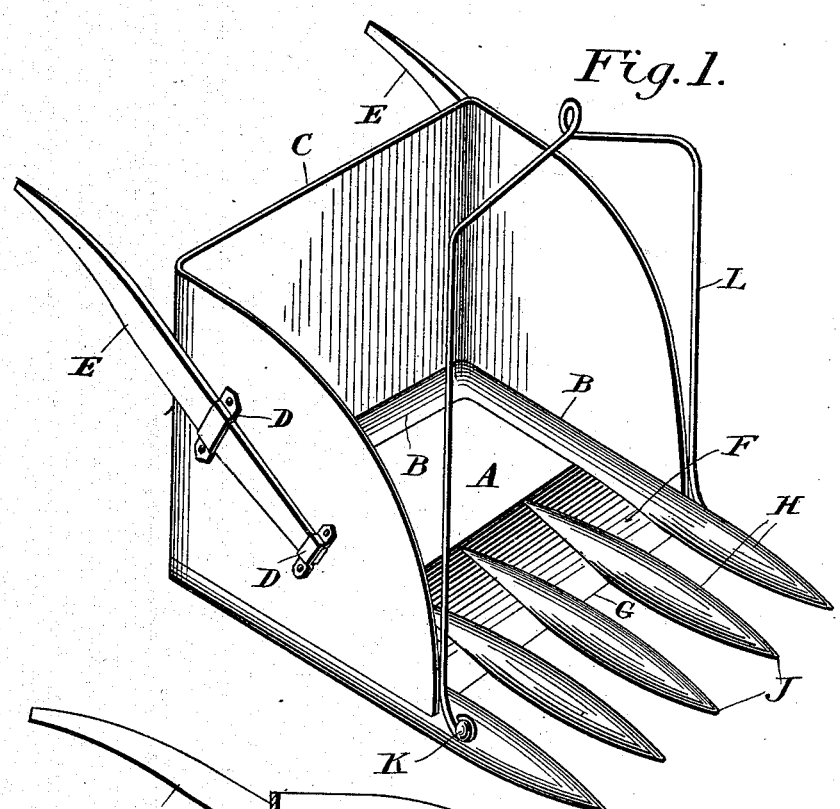
Figure 2:
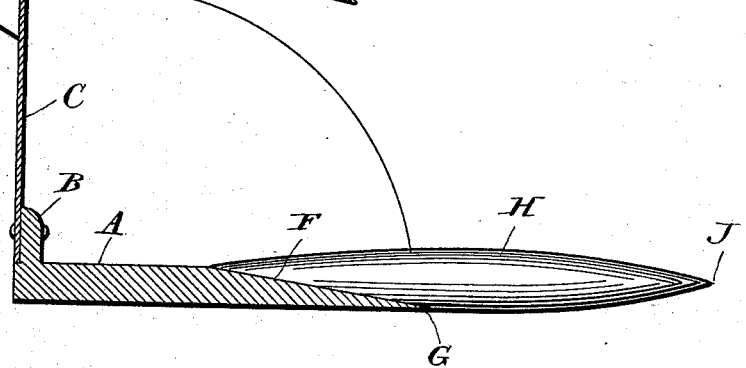
Figure 3:
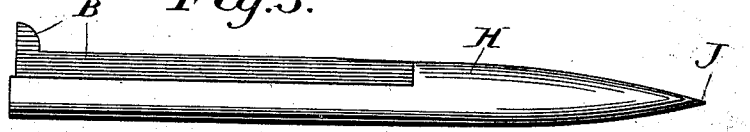

Figure 1 represents a perspective view of my combined scraper and scoop. Fig. 2 represents a central longitudinal sectional view, and Fig. 3 represents a detail view of the bottom of the device detached.

A designates the bottom of my combined scraper, which is formed with an upward-projecting flange or rim B, to which is rigidly secured the hood or scoop portion C, provided on each side with the cleats D to receive and secure the lower end of the handles E. From this construction it will be seen that the bottom rests flat upon the surface or ground and that the hood or scoop is properly arranged to receive the material, and the forward portion of the bottom is formed with the incline F, which provides the scraping edge G, and leading from the said scraping edge and in line are the tines H, which are of substantially oval shape in cross-section and terminate in the pointed ends J, and to the outer faces of the tines are secured studs K, to waich is attached the draft-loop L, to which the draft-animal is attached to draw the device over the ground.

It will be seen that the bottom of the scraper and scoop rests flat upon the ground and that when drawn along the tines lift the material and convey it to the scoop and the sharp edge of the bottom cuts the material clean from the ground or surface and conveys it up the inclined face to the scoop, and thus the device performs the function of a scraper and scoop in a perfect manner. It will also be seen that the improvement is of very simple, strong, and durable construction, and inexpensive of production, and that it can be easily taken apart for the purpose of shipping or storing.

I claim—

1. The combined scraper and scoop herein described, consisting of the bottom having the rear and sides extending upward to form a support, the scoop fitted to said upward-extending rear and sides, handles connected to the scoop, the tines extending from the front of said bottom, and the inclined forward portion to which said tines lead.

2. The combined scraper and scoop herein described consisting of the bottom, the forward portion of which is inclined and provided with a sharpened edge and the rearward side provided with a flange and offset, the scoop portion secured thereto, the tines projecting from said sharpened edge, the outermost tines forming a support for the sides of the scoop, studs projecting from the outermost tines beyond the sharpened edge, a draft-loop pivotally mounted on said studs and handles secured to opposite sides of the scoop, all substantially as shown and described.

In testimony whereof I affix my signature in presence of two witnesses:

SIMON M. SPANGLER.

Witnesses:
LEWIS C. BALL,
D. W. JOHNSTON.